J. H. BURKHOLDER.

LIFTING JACK.

APPLICATION FILED NOV. 14, 1910.

Reissued Sept. 5, 1911.

13,289.

3 SHEETS—SHEET 1.

ATTEST
E. M. Fisher
J. C. Musson.

INVENTOR
JOHN H. BURKHOLDER.
By Fisher & Moore Attys.

COLUMBIA PHONOGRAPH CO., WASHINGTON, D. C.

J. H. BURKHOLDER.

LIFTING JACK.

APPLICATION FILED NOV. 14, 1910.

Reissued Sept. 5, 1911.

13,289.

3 SHEETS—SHEET 2.

ATTEST
E. M. Fisher
J. C. Museum.

INVENTOR
JOHN H. BURKHOLDER
BY Fisher & Moser
ATTYS.

COLUMBIA PLANOGRAPH CO., WASHINGTON, D. C.

J. H. BURKHOLDER.

LIFTING JACK.

APPLICATION FILED NOV. 14, 1910.

Reissued Sept. 5, 1911. 13,289.

3 SHEETS—SHEET 3.

ATTEST

E. M. Fisher

R. C. Mussun.

INVENTOR

JOHN H. BURKHOLDER.

BY Fisher & Moser, ATTYS.

COLUMBIA PLANOGRAPH CO., WASHINGTON, D. C.

UNITED STATES PATENT OFFICE.

JOHN H. BURKHOLDER, OF ASHLAND, OHIO, ASSIGNOR TO THE ELITE MANUFACTURING COMPANY, OF ASHLAND, OHIO, A CORPORATION.

LIFTING-JACK.

13,289. Specification of Reissued Letters Patent. Reissued Sept. 5, 1911.

Original No. 963,206, dated July 5, 1910, Serial No. 544,917. Application for reissue filed November 14, 1910. Serial No. 592,408.

DIVISION A.

*To all whom it may concern:*

Be it known that I, JOHN H. BURKHOLDER, a citizen of the United States, residing at Ashland, in the county of Ashland and State of Ohio, have invented certain new and useful Improvements in Lifting-Jacks, of which the following is a specification.

My invention relates to lifting jacks, and the invention consists in a jack having a gravity return as well as certain novel operating and controlling parts combined therewith, all substantially as shown and described and particularly pointed out in the claims.

Figure 1:
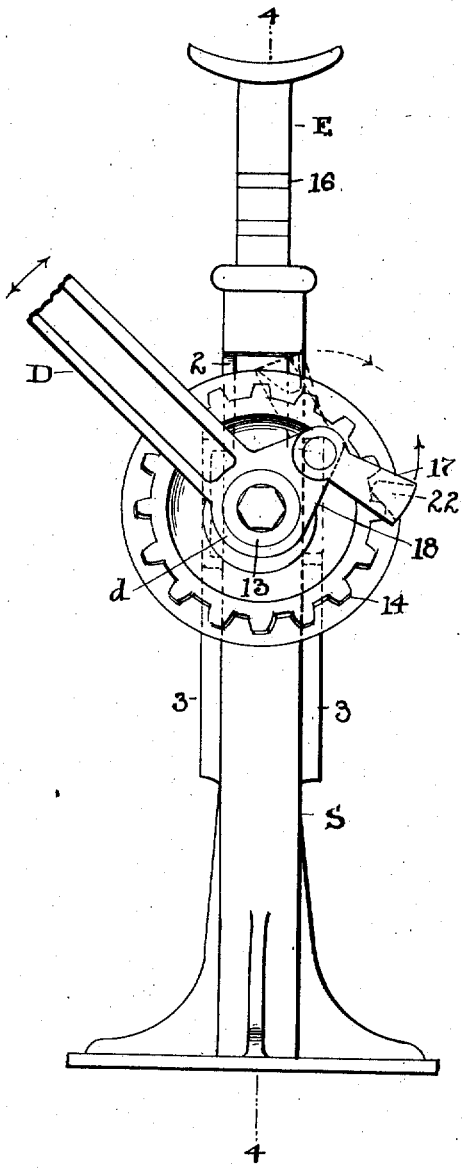
Figure 2:
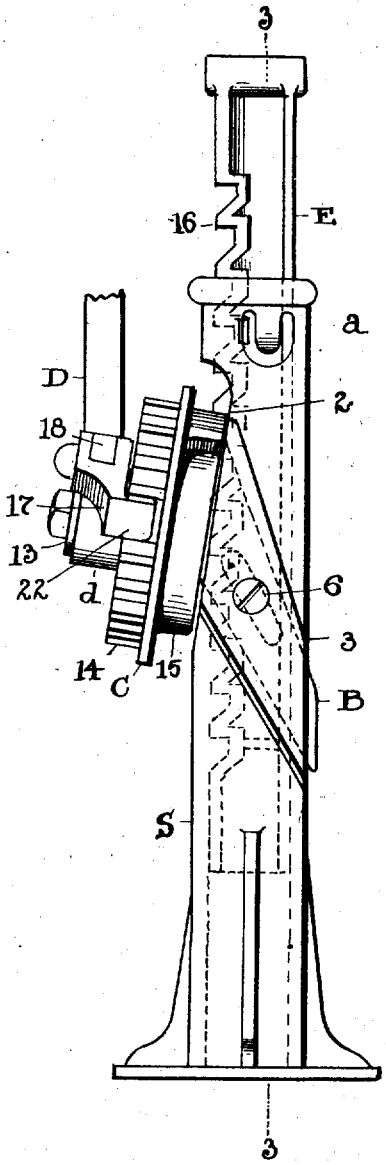
Figure 3:
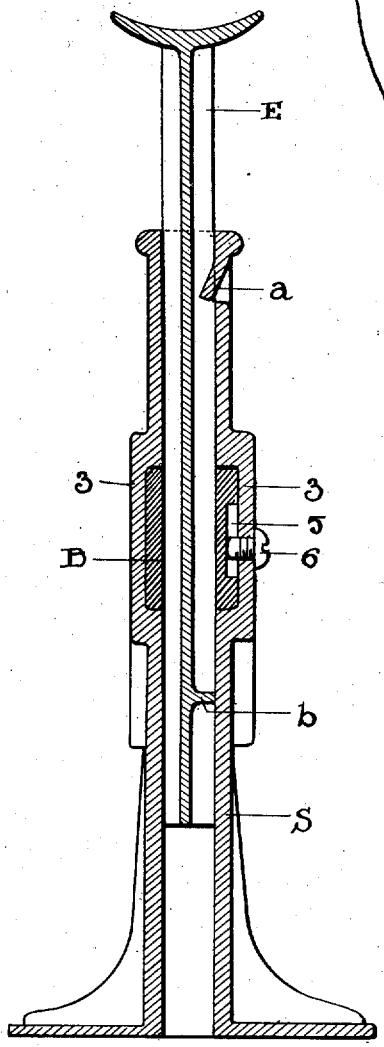
Figure 4:
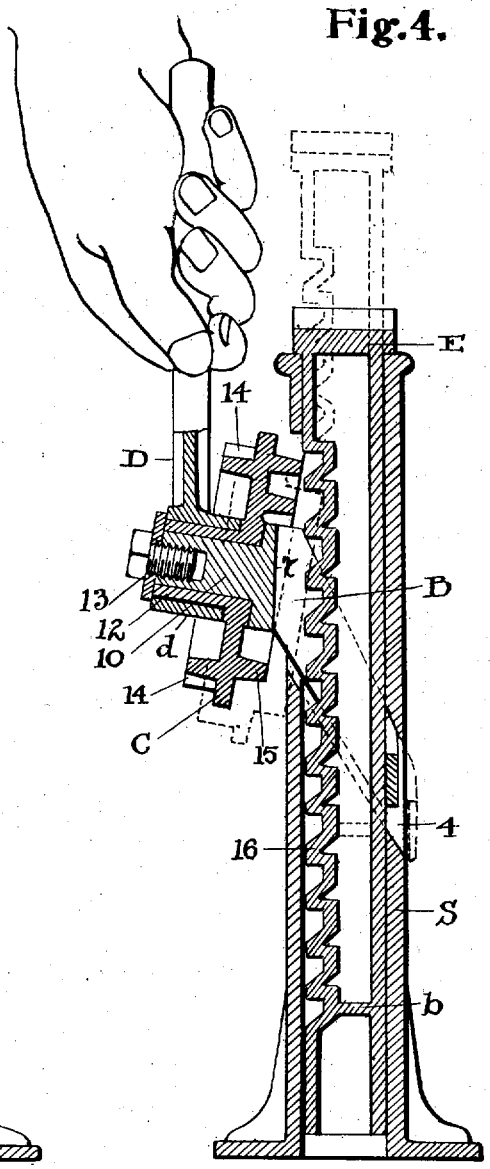
Figure 6:
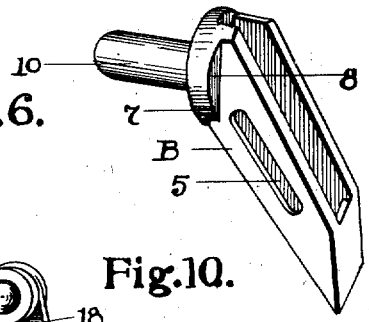
Figure 10:
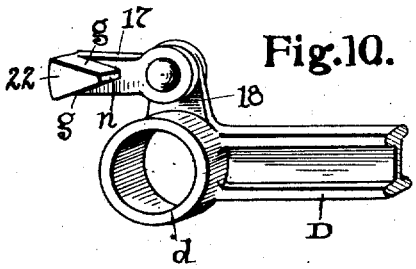
Figure 5:
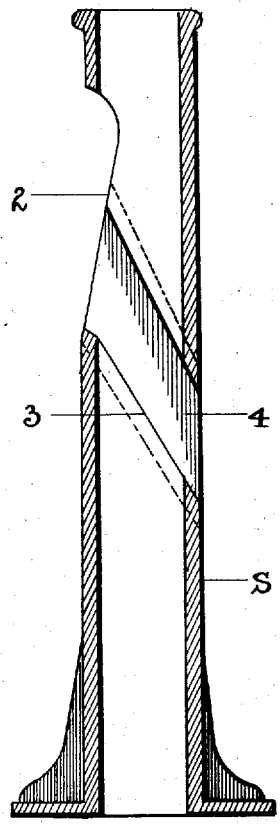
Figure 7:
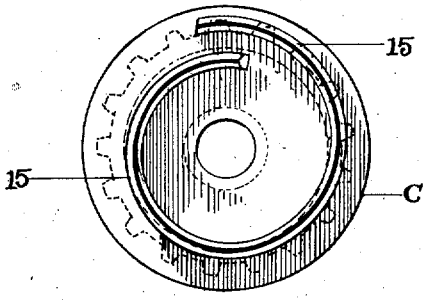
Figure 8:
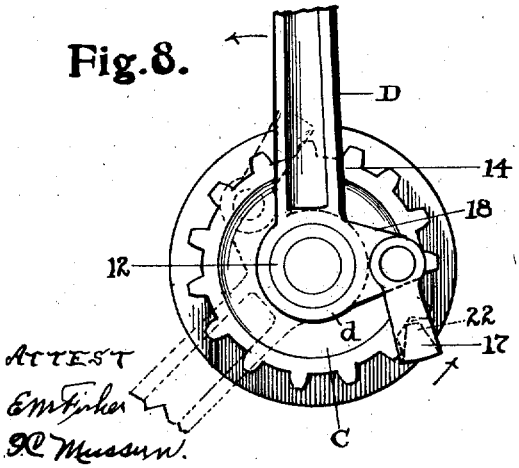
Figure 9:
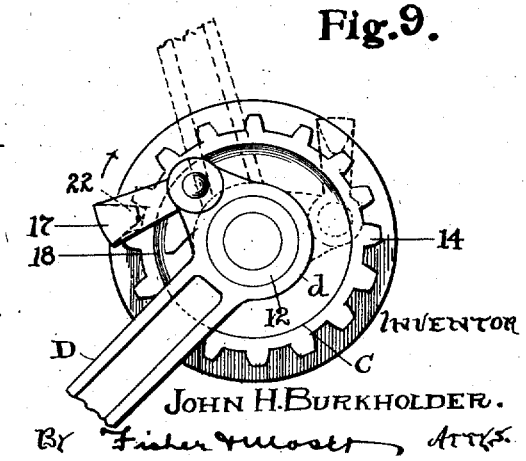

In the accompanying drawings, Figure 1 is a front elevation of the jack, and Fig. 2 is a side elevation thereof at right angles to Fig. 1. Fig. 3 is a central sectional elevation on a line corresponding to 3—3, Fig. 2, looking to the rear or right, and Fig. 4 is a sectional elevation at right angles to Fig. 3 and corresponding to 4—4, Fig. 1. Fig. 5 is a vertical sectional elevation of the standard alone. Fig. 6 is a perspective view of the so-called yoke. Fig. 7 is a side elevation of the combined ratchet and cam wheel, and Figs. 8 and 9 are side elevations of said wheel and of the controlling lever and pivoted dog or pawl as hereinafter fully described. Fig. 10 is a perspective detail of the lever and dog.

The construction thus shown comprises several separate and distinct elements operatively related and begins with the standard S as a support for all the others. The said standard is tubular and provided with a suitable base and a scarf or cutaway portion 2 at its side and top deepest at its top and outwardly inclined downward and adapted to receive the yoke B. To this end the said standard is also provided with enlargements 3 at its sides forming inside guideways for said yoke and inclined at an acute angle to the axis of the standard downward and ending in an open slot 4 in the rear wall thereof.

The yoke B has an open or skeleton body with parallel flat sides tapered slightly between its ends as to top and bottom to seat in the correspondingly tapered guideways within enlargements 3, and has a channel or groove 5 lengthwise in one side adapted to be engaged by a screw 6 through the side of the standard and to retain the yoke in place. The said yoke also has a head 7 with shoulders 8 at its side adapted to rest against the inclined edges 2 of the standard and a spindle 10 upon which the operating parts C and D are mounted. The said wheel has a tubular hub 12 at its outer side and is rotatably confined on said spindle by washer and screw 13 and said lever or handle D has a hub *d* sleeved over the hub 12 of wheel C and is rotatably confined thereon by said washer.

The wheel C has teeth 14 about its outer side next to its central periphery or edge and a cam 15 on its inner side adapted to operatively engage teeth or projections 16 on the lift-bar or member E. A dog or pawl 17 is pivotally mounted on the extremity of a right angled projection or extension 18 at the base and edge of lever D opposite its pivot on hub 12 and is adapted to be reversed or thrown to either side into engagement with the teeth 14 to operate the wheel C by lifting or depressing the lever as hereinafter more fully described.

The yoke B is slidable in its guides within limits fixed by screw 6 as above set forth, and when down in use rests with its shoulders 8 against standard S, which brings cam 15 on wheel C into working engagement with teeth 16. The jack is then ready to be operated either up or down. A novel feature of the invention lies in the construction and arrangement of the said yoke and the parts it carries in respect to the standard and lift-bar in this, that by drawing the yoke outward so as to disengage the cam 15 from the teeth 16 the lift-bar E is free to be raised or lowered, and if raised will drop by gravity when said parts are withdrawn, as occurs when the handle D is gripped to carry the jack away, Fig. 4. Then the said bar E is free to drop to its limits in the standard, Fig. 4. A tooth *a* on the standard struck in after the parts are assembled is adapted to engage a web *b* on the lift bar and prevent its withdrawal from the standard. The said yoke or supporting member B is open through its center to afford room for lift member E and to enable the yoke to be drawn out more or less to disengage wheel C, and the transverse guideways 3 are preferably placed at about the angle of inclination shown.

As above indicated, the ratchet dog or pawl 17 is pivoted on the extremity of the projection or extension 18 on pivot hub *d* of lever D and said pawl has an inwardly projecting V shaped tooth 22 laterally at its end and side which has flat sides *g* and a central edge or bite *n* adapted to engage over or upon the teeth 14 of the wheel C and rotate said wheel in either direction according as said pawl is thrown to one side or the other of said projection and said lever is operated with a downward or an upward movement, Figs. 8 and 9.

Special importance attaches to this construction and arrangement of parts, first, because actuating mechanism is thus provided at the nearest practicable point to the pivot of the lever to get the maximum of lift with a given amount of expended strength, but for the more important reason that it provides reversal of operation by simply throwing the pawl across its pivot to either side. Obviously to do this the said pawl must have its pivot at or opposite the pivotal axis of the lever on a different radial line than said lever and preferably at right angles thereto so that said pawl will always be in such relation to the circle of teeth 14 that it can be turned in an arc about said axis an equal distance to either side and work in like manner in both positions. This also enables me to use what is essentially a gravity pawl or one which will ride or slide from tooth to tooth over the series of teeth 14 in its return and drop by its own weight or gravity into working engagement with the first advance tooth whichever way the lever is operated. The stroke of the lever is always between the same radial points on the same side of standard S in either operation, and this is a necessary requirement and advantage only to be gained in a gravity pawl by locating the pivot thereof on the handle substantially as shown and described.

In operation, if the parts be in the position full lines, Fig. 8, and lever D be depressed in the direction of the arrow or toward the dotted lines the wheel C will be engaged by the pawl and rotated a corresponding distance, and then as the said lever is raised again to full lines or in that direction the pawl will be carried with a sliding movement on one of its flat sides back over the teeth 14 and gravitate or drop into engaging position at the end of the stroke. A like result follows when the pawl is thrown to the opposite side of projection 18, as in Fig. 9, and lever D is raised to effect rotation of wheel C.

In all the operations of the jack the cam 15 on the back of wheels C holds the lift member where it has been moved and permits the lever and pawl to be freely operated and take a new hold. When the parts are as shown in Fig. 8 the lever is adapted to be depressed to lift the load, and when as shown in Fig. 9 the lever and pawl are in position to raise the lever and lower the load. In both cases the pawl is intended to hold a corresponding operating relation to the lever and projection 18 on opposite sides thereof and in either case until purposely changed and does not reverse by mere gravity. The dotted lines in Fig. 9 show the extreme limit to which the pawl can be carried without self reversal but ordinarily the operator would not deem it safe to carry it so far around. In this respect Fig. 8 shows a safer relation of the parts.

What I claim is:

1. In lifting jacks, a standard and a lift member therein having teeth at its edge, in combination with a lift mechanism mounted on said standard and engaged with said teeth, said mechanism comprising a yoke set at an inclination in said standard and slidable therein.

2. A lifting jack comprising a standard and a lift member therein, in combination with a laterally slidable member set at an inclination to said standard, a rotatable wheel mounted on said slidable member and having a cam operatively engaged with said lift member, a lever and a dog pivoted thereon operatively engaging said wheel.

3. A lifting jack having a tubular standard with an inclined facing at its front and top open to the inside thereof and having downwardly inclined guideways in its sides from said facing to its rear, in combination with a yoke in said guideways having a spindle at its front, a wheel rotatably mounted on said spindle, a lift member in said standard operatively engaged by said wheel and devices to operate the wheel.

4. A lifting jack comprising a tubular standard, a lift member slidable therein, a two-sided yoke set at an inclination in the sides of said standard and adapted to accommodate the said member between the sides thereof, and means mounted on said yoke in actuating relations with said lift member.

5. A standard and a lift member therein having teeth lengthwise of its edge, and a wheel mounted at the side of said standard and having a cam operatively engaged with said lift member, in combination with a yoke having a divided body supported at an inclination in said standard and carrying said wheel and said lift member adapted to operate between the sides of said yoke.

6. In lifting jacks, a tubular standard and a lift member therein and a wheel operatively engaging said member, in combination with a yoke mounted at an inclination in said standard and slidable within limits therein and having a spindle on its upper end outside said standard on which said wheel is mounted and means supported on said spindle having operating engagement with said wheel.

7. In lifting jacks, a hollow standard and a lift member therein having teeth on its side, an engaging and disengaging cam movably mounted upon said standard for said lift member, and an inclined laterally slidable support extending through said standard and having said cam mounted thereon.

8. In lifting jacks, a standard and a lift member therein and means operatively engaged with said lift member adapted to be disengaged therefrom and permit said member to drop by gravity, said means comprising a yoke removably supported in inclined guideways in said standard and a wheel mounted on said yoke outside said standard and provided upon its back with an actuating portion engaging said lift member.

9. A lifting jack comprising a standard and a lift member therein, a yoke slidably mounted in said standard and a wheel mounted on said yoke having a cam adapted to engage said lift member, whereby when said yoke is sufficiently withdrawn said lift member is free to be moved up or down.

10. A lifting jack comprising a standard having guideways in its sides, a yoke slidably mounted in said guideways and a rotatable wheel mounted thereon and having a cam on its back, a lift member slidable in said standard and having a series of teeth adapted to be engaged by said cam.

11. In lifting jacks, a standard and a lift member therein having a row of teeth, said standard having a side opening through which said teeth are exposed, in combination with a cam wheel engaging said teeth through said opening and a support for said wheel adapted to slide laterally in said standard and thus disengage said wheel from said lift member.

12. A lifting jack having a tubular standard provided with inclined guideways transversely thereof and a lift member in said standard, in combination with a yoke slidable in said guideways and a rotatable member mounted on said yoke having teeth about its edge and a cam on its back in operating connection with said lift member, and means to operate said rotatable member.

13. In lifting jacks, a standard having inclined and tapered guideways in its sides and a cutaway facing at the entrance to said guideways, in combination with a lift member in said standard having teeth along its front next to said facing, and means to operate said lift member slidably mounted in said guideways and comprising a rotatable cam engaging said lift member.

In testimony whereof I affix my signature in the presence of two witnesses.

JOHN H. BURKHOLDER.

Witnesses:
E. M. Fisher,
F. C. Mussun.

Copies of this patent may be obtained for five cents each, by addressing the "Commissioner of Patents, Washington, D. C."